United States Patent
Long et al.

(10) Patent No.: US 7,165,867 B2
(45) Date of Patent: Jan. 23, 2007

(54) SYSTEMS AND METHODS FOR INTEGRATING LIGHT

(75) Inventors: Michael Long, Corvallis, OR (US); P. Guy Howard, Junction City, OR (US); Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/490,194

(22) Filed: Jul. 19, 2006

(65) Prior Publication Data

US 2006/0256562 A1    Nov. 16, 2006

(51) Int. Cl.
*F21V 5/00*    (2006.01)

(52) U.S. Cl. .................. 362/328; 362/235; 362/241; 362/339; 362/608

(58) Field of Classification Search .......... 362/328, 362/235, 241, 339, 608–610, 613, 624, 626, 362/627; 353/33, 81, 98, 99; 359/618, 625, 359/639, 640, 831, 837
See application file for complete search history.

(56) References Cited

U.S. PATENT DOCUMENTS

| | | | |
|---|---|---|---|
| 720,386 A | 2/1903 | Wadsworth | |
| 4,322,128 A * | 3/1982 | Brake | 359/555 |
| 4,505,264 A | 3/1985 | Tremblay | |
| 5,796,526 A | 8/1998 | Anderson | |
| 6,021,007 A | 2/2000 | Murtha | |
| 6,252,636 B1 | 6/2001 | Bartlett | |
| 6,341,876 B1 * | 1/2002 | Moss et al. | 362/268 |
| 6,412,954 B1 | 7/2002 | Wang | |
| 6,419,365 B1 | 7/2002 | Potekev et al. | |
| 2001/0030857 A1* | 10/2001 | Futhey et al. | 362/31 |
| 2001/0048562 A1 | 12/2001 | Bartlett et al. | |
| 2003/0099008 A1 | 5/2003 | Cannon et al. | |
| 2003/0107714 A1 | 6/2003 | Cheng | |
| 2003/0107715 A1 | 6/2003 | Wang | |
| 2003/0111534 A1 | 6/2003 | Hillmann | |
| 2003/0123163 A1 | 7/2003 | Penn | |
| 2003/0145708 A1 | 8/2003 | Presby | |
| 2003/0151834 A1 | 8/2003 | Penn | |

FOREIGN PATENT DOCUMENTS

| | | | |
|---|---|---|---|
| EP | 0740178 A2 | 10/1996 | |
| EP | 0837350 A1 | 4/1998 | |

\* cited by examiner

*Primary Examiner*—Sandra O'Shea
*Assistant Examiner*—Tsidulko

(57) ABSTRACT

A light integrating system includes at least one total internal reflection (TIR) prism and a light integrating device disposed to collect and homogenize light exiting from the TIR prism.

14 Claims, 7 Drawing Sheets

SYSTEMS AND METHODS FOR INTEGRATING LIGHT

RELATED APPLICATION

The present application claims the priority under 35 U.S.C. §120 of previous U.S. patent application Ser. No. 10/772,999, filed Feb. 5, 2004 now U.S. Pat. No. 7,101,063, for "Systems and Methods for Integrating Light," which application is incorporated herein by reference in its entirety.

BACKGROUND

Optical devices, including light sources, are widely used in many forms of technology. For example, such optical devices may be used in information transmission, display applications, medical procedures, and a wide variety of other applications. Optical sources used in these and other applications include, for example, lasers, laser diodes, arc lamps, light emitting diodes ("LEDs"), incandescent light bulbs, etc.

In order to more effectively apply optical devices to current technology, it is sometimes desired to increase the brightness of an optical source. Due to physical limitations, optical devices may lack the intensity needed for a specific application or to meet various performance standards. In such cases, light from multiple optical sources may be used to achieve the total brightness needed. However, it has been difficult to uniformly blend the light from multiple sources to result in a uniform light beam suitable to a particular application.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

As will be described herein, a Total Internal Reflection (TIR) prism can be used to integrate the light from two or more optical sources. Multiple TIR prisms can be stacked and mated into a light integrating rod for combining the light from multiple optical sources. The resulting light beam is a uniform blending of the light from the various optical sources used. Additionally, a TIR prism can be used to combine light from two differently colored light sources to correct a color deficiency in one of the sources or to provide a particular frequency range in the resulting output beam.

Figure 1:
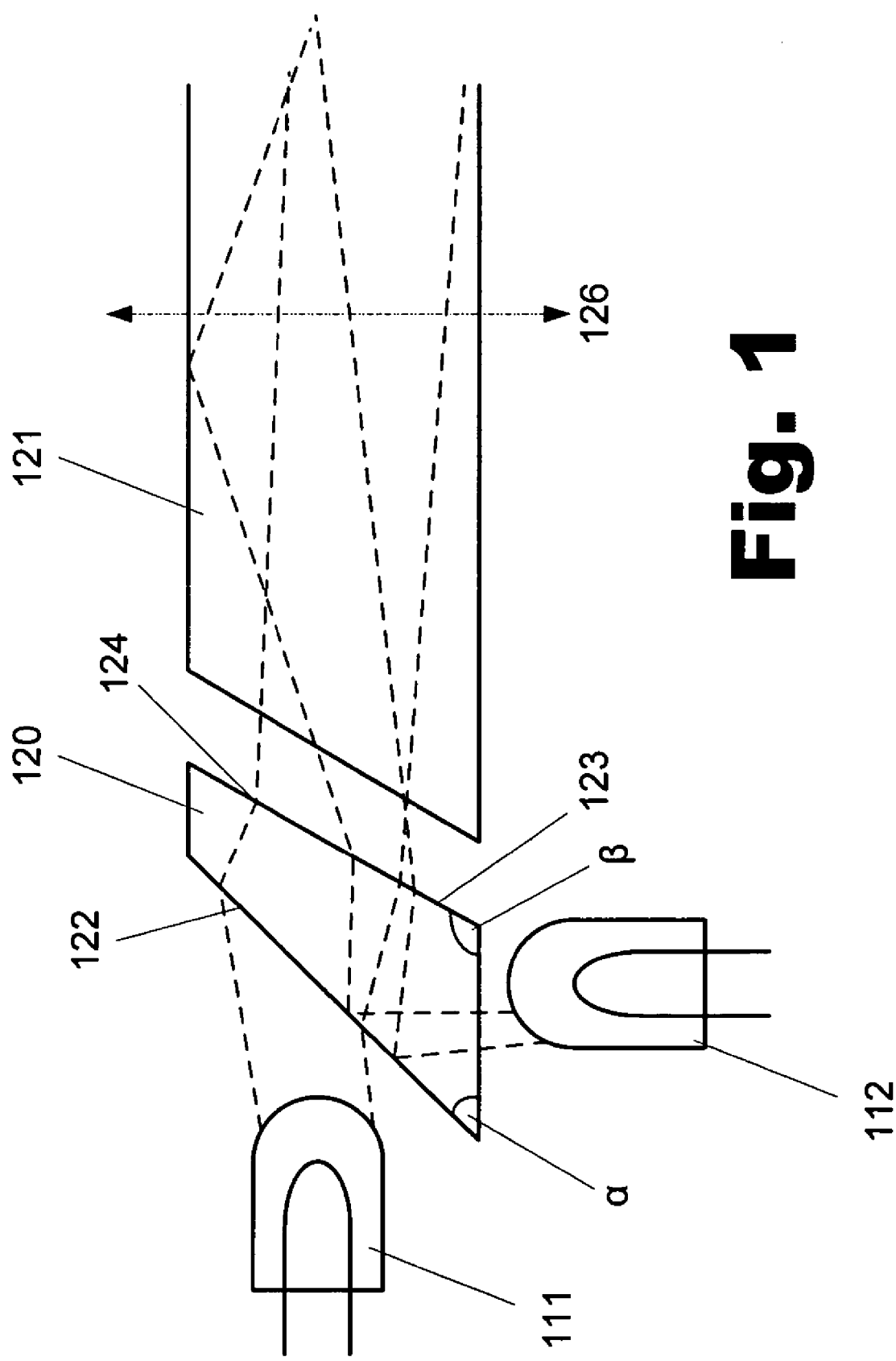
FIG. 1 illustrates a system according to principles described herein in which light from two light sources is integrated.

FIG. 1 illustrates a system according to principles described herein in which light from two light sources is integrated. As shown in FIG. 1, a TIR prism (120) is used to collect and combine light from two different optical sources (111, 112). The optical sources (111, 112) may be any kind of optical source including, but not limited to, lasers, laser diodes, arc lamps, light emitting diodes ("LEDs"), incandescent light bulbs, etc. The optical sources (111, 112) may be the same type of optical source or may be different types of optical sources. The optical sources (111, 112) may have the same or different wavelengths.

Light from a first optical source (111) enters through a first face (122) of the prism (120). Light from the second optical source (112) enters through the base (123) of the prism (120). The prism (120) internally reflects and, consequently, blends the light from the two sources (111, 112). The blended light from the two sources (111, 112) exits from a second face (124) of the prism (120). Light will be totally internally reflected whenever an incident ray of light enters an air glass interface from the glass side at an angle greater than the critical angle [defined by $(\sin^{-1}(1/n))$ where n is the refractive index of the glass at the wavelength of the given ray of light] with the normal to the interface.

In some embodiments, the first face (122) of the prism (120) makes an angle $\alpha$ of 45° with respect to the base (123). The second face (124) makes an angle $\beta$ of 120° with respect to the base (123). The total internal reflection takes places at the first face (122) as shown in FIG. 1. It is important that the second wall is tilted appropriately so that the light does not bend towards the base too rapidly and leak out of the system.

The light from either or both sources (111, 112) may be collimated, but collimation is not required. This is true of all embodiments described. The two light sources (111, 112) can be the same color so as to produce a more intense light beam than either source produces alone. Alternatively, the two light sources (111, 112) can be two different colors or wavelengths so as to produce an output light beam that blends the wavelengths of the two sources (111, 112). In any case, the prism (120) does not require any dichroic coating.

The light exiting from the prism (120) is then directed through a light integrating device (121). The light integrating device (121) is optically coupled to the TIR prism (120) and further blends or homogenizes light exiting from the prism (120) to produce light that is more spatially uniform. In one embodiment, the light integrating device may be a light integrating tunnel with inner sides coated for a broadband reflection. The tunnel may have a rectangular cross-section taken, for example, along line (126). The tunnel may also have a rectangular aperture. In another embodiment, the device (121) may be a solid rod or light pipe. In another embodiment, the integrating device (121) may be a fly's eye type condenser lens system. The light integrating device (121) collects the light from the prism (120) and homogenizes the light through multiple reflections. Consequently, the light exiting the device (121) is spatially uniform. As shown in FIG. 1, the light integrating device (121) may have an angled face coupled to the prism (120), but this is not necessarily so.

The light from the system shown in FIG. 1 can then be used in a wide variety of applications. For example, the resulting light beam can be collected by a condenser lens for projection on to a light modulating device.

Figure 2:
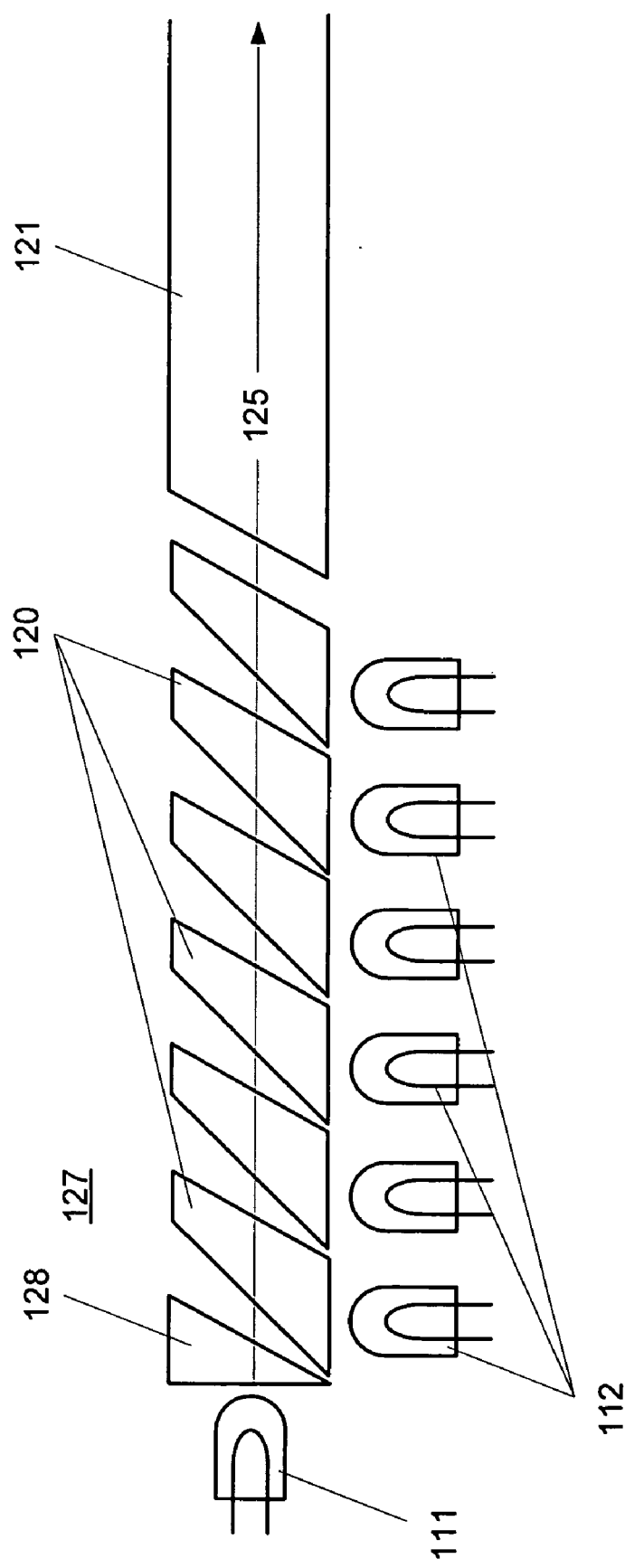
FIG. 2 illustrates a system according to principles described herein in which light from a number of light sources is integrated.

FIG. 2 illustrates a system according to principles described herein in which light from a number of light sources is integrated. As shown in FIG. 2, any number of TIR prisms (120) may be stacked or optically coupled along an optical axis (125).

A first light source (111) emits light along the optical axis (125) of the system. The light from the first source (111) is directed through the stack of TIR prisms (120) and, in some embodiments, into a light integrating device (121).

A number of additional light sources (112) may be respectively associated with the TIR prisms (120). Each additional light source (112) provides light that enters a TIR prism (120) at an angle, in some cases a right angle, to the optical axis (125) of the system.

The TIR prisms (120) redirect the light of the additional sources (112) along the optical axis (125) of the system and blend the light from all sources (111, 112) together. In some embodiments, the resulting light beam may be further homogenized by the light integrating device (121).

The light sources can be staggered or tilted to ensure increased coupling. The TIR prisms can be easily mass manufactured using molded glass. To put the array of TIR prisms together, the prisms can be mounted with an adhesive on a glass plate (127) that is coated with aluminum for a broad band high reflection. The aluminum coating can be opened or removed at places where a port is required to accept light from an LED.

The TIR interface, or the surface of the TIR prism that allows light to exit along the optical axis (125), may have a special coating that allows light transmission at a wide range of angles across the air-glass interface when the light enters from air into glass. This coating may consist of a stack of about 8 layers from two different materials designed to perform as an antireflection coating at high angles of incidence. Those surfaces of the TIR prism that lie along the optical axis may have a strong anti-reflective coating to maximize the collection efficiency at the light integrating device (121). Other surfaces of the TIR prism can have an aluminized coating for a broadband reflection of light to minimize the beam walkover outside the light integrating device made up of TIR prisms.

Figure 3:
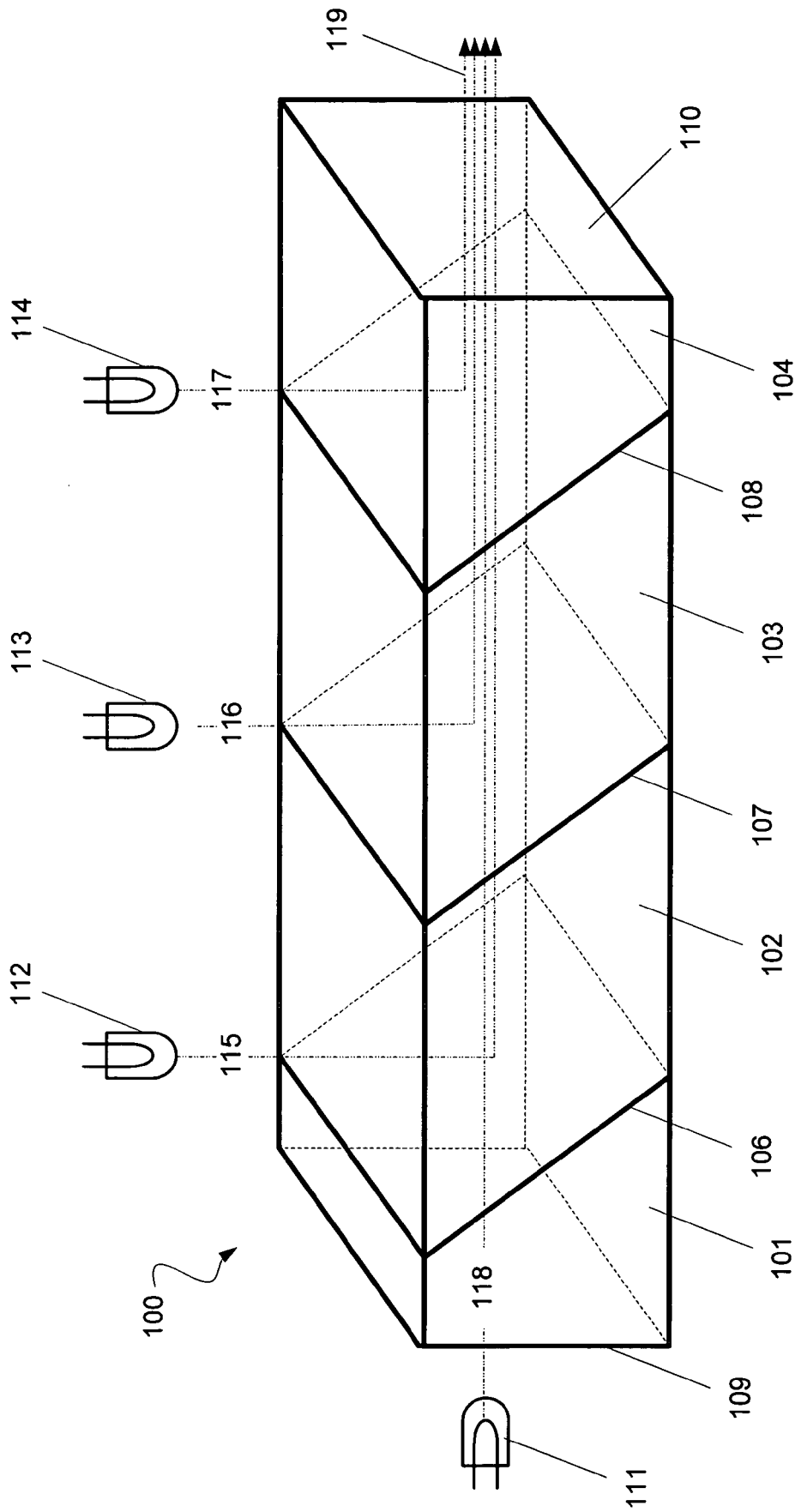
FIG. 3 illustrates a system according to principles described herein in which light from a number of light sources is integrated using a solid integration rod.

FIG. 3 illustrates a system according to principles described herein in which light from a number of light sources is integrated using a solid integration rod. As shown in FIG. 3, the light integrating rod (100) may be formed by mating a number of optical elements (101–104) to form a stack of TIR prisms along an optical axis. It needs to be noted that FIG. 3 and the subsequent FIGURES are conceptual drawings in certain respects. As shown in FIG. 2, between any two prisms there is a wedge shaped air-gap that is not illustrated in Fig. 3 and subsequent drawings. In fact, the optical element (128) adjacent the light source (111) in FIG. 2 is used to allow an appropriate air-gap before the first TIR prism (120). The wedge-shaped air-gap and a strong anti-reflection coating at the air/glass interface minimize the bending of the beam towards the prism base and also reduces total internal reflections for a beam that is supposed to travel along the optical axis without any further reflections.

FIG. 3 illustrates a system according to principles described herein in which light from a number of light sources is integrated using a solid integration rod. As shown in FIG. 3, the light integrating rod (100) may be formed by mating a number of optical elements (101–104) to form a stack of TIR prisms along an optical axis. It needs to be noted that FIG. 3 and the subsequent Figures are conceptual drawings in certain respects. As shown in FIG. 2, between any two prisms there is a wedge shaped air-gap that is not illustrated in FIG. 3 and subsequent drawings. In fact, the optical element (128) adjacent the light source (111) in FIG. 2 is used to allow an appropriate air-gap before the first TIR prism (120). The wedge-shaped air-gap and a strong anti-reflection coating at the air/glass interface minimize the bending of the beam towards the prism base and also reduces total internal reflections for a beam that is supposed to travel along the optical axis without any further reflections.

As shown in FIG. 3, the first optical element (101) is a block having a flat or vertical face (109) on one side and an angled face opposite. This first element (101) is mated with a second optical element (102). The second optical element (102) has the profile of a parallelogram with an angled face on both ends. One angled face of the second element (102) mates with the angled face of the first element (101). This interface of the first and second optical elements (101, 102) forms a first TIR prism (106). Similarly, a third optical element (103) with angled faces on both ends mates with the other end of the second optical element (102) to form a second TIR prism (107).

The fourth optical element (104) is similar to the first optical element (101), but inverted. The fourth element (104) has an angled face that mates with the other angled face of the third element (103) to form a third TIR prism (108). The other face (110) of the fourth element (104) may be vertical or flat and transmits light from the rod (100) to, for example, a light integrating device or tunnel, light modulator or other optical device.

It will be understood that any number of additional optical elements could be added to the rod (100) so as to provide any number of desired TIR prisms within the light integrating rod (100). The number of TIR prisms formed corresponds to the number of light sources from which light is to be integrated or blended by the rod (100).

As shown in FIG. 3, a first light source (111) generates a light beam (118). The light beam (118) is directed into the rod (100) through the surface (109) of the first optical element (101). The light beam (118) then propagates along the optical axis of the rod (111) and exits from the opposite end surface (110). The light source (111) may be, for example, a white light source.

Three other light sources (112–114) are disposed along the length of the rod (100). The positions of these light sources (112–114) correspond to the TIR prisms (106–108) in the rod (100). In one embodiment, the three light sources (112–114) may be red, green and blue light sources, respectively. As above, the light from any given source may or may not be collimated.

Moving from left to right in FIG. 3, the next light source (112) emits a light beam (115) that enters a face of the second optical element (102) and is reflected along the optical axis of the rod (100) by the TIR prism (106) formed at the intersection of the first and second optical elements (101, 102). The light from this source (112) is consequently blended or integrated with the light from the first light source (111).

Similarly, the next light source (113) emits a light beam (116) that enters a face of the third optical element (103) and is reflected along the optical axis of the rod (100) by the TIR prism (107) formed at the intersection of the second and third optical elements (102, 103). The light from this source (113) is consequently blended or integrated with the light from the preceding light sources (111, 112).

Similarly, the next light source (114) emits a light beam (117) that enters a face of the fourth optical element (104)

and is reflected along the optical axis of the rod (100) by the TIR prism (108) formed at the intersection of the third and fourth optical elements (103, 104). The light from this source (114) is consequently blended or integrated with the light from the preceding light sources (111–113).

As a result, an integrated light beam (119) is emitted from the end surface (110) of the light integrating rod (100). This beam (119) is an integration of the light from all the light sources (111–114) disposed along the rod (100). As indicated, the embodiment of FIG. 3 is merely one example. Any number of optical elements may be used, any number of TIR prisms formed and any number of light sources integrated using a light integrating rod according to the principles described herein. Additionally, the lights integrated may be of the same or different wavelengths, as described, and may or may not be collimated.

Figure 4:
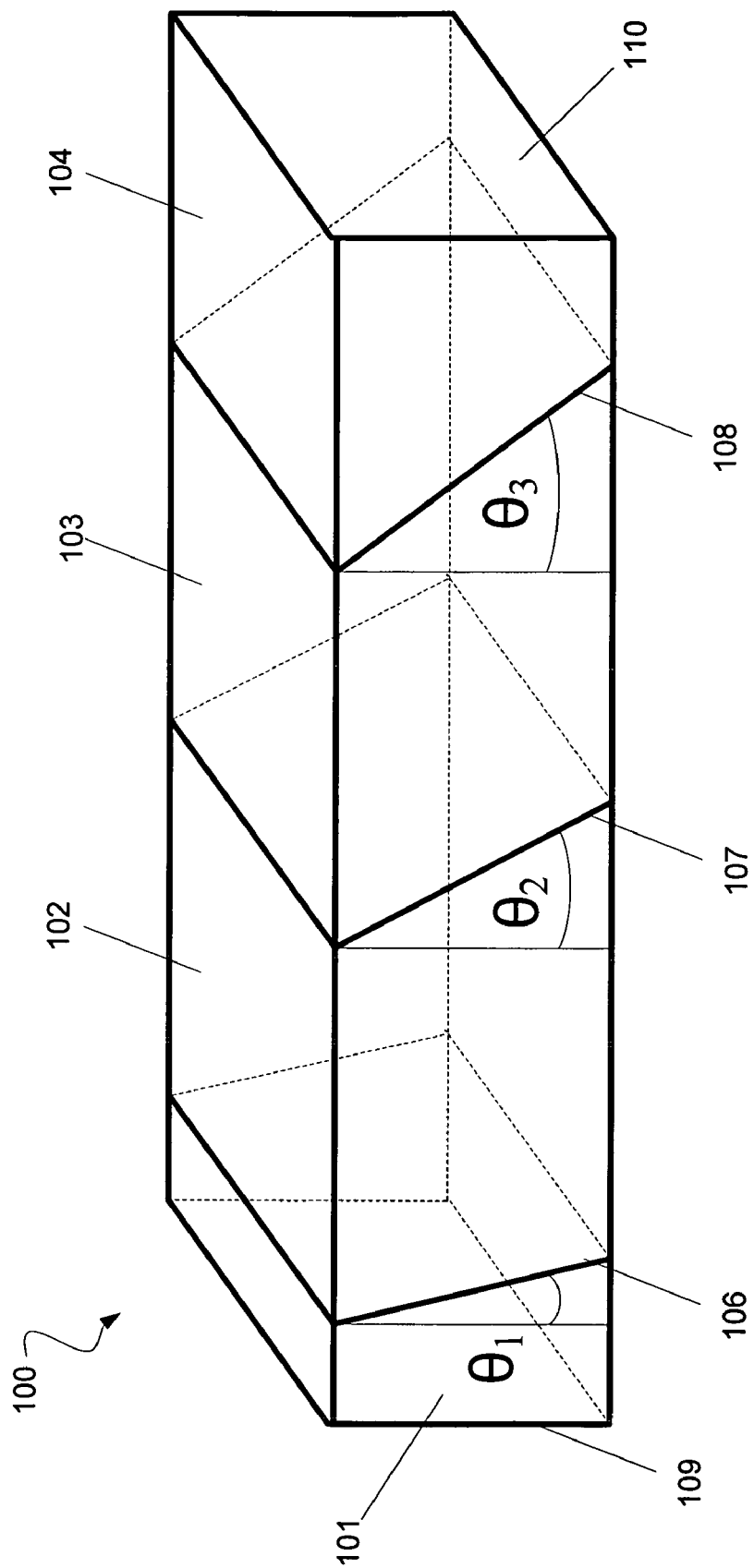
FIG. 4 is another illustration of the integration rod of FIG. 3.

FIG. 4 is another illustration of the integration rod of FIG. 3. As shown in FIG. 4, the angled surfaces of the various optical elements may have different angles.

For example, the angle of the first TIR prism (106) (i.e., the interface of the first and second optical elements) may be a first angle $\theta_1$ with respect to vertical or the first face (109) of the rod (100). The second TIR prism (107) (i.e., the interface of the second and third optical elements) may be at a second, steeper angle $\theta_2$ with respect to vertical or the first face (109) of the rod (100). The third TIR prism (108) (i.e., the interface of the third and fourth optical elements) may be at a third and still steeper angle $\theta_3$ with respect to vertical or the first face (109) of the rod (100). The light sources are angled/tilted appropriately to allow for maximum light propagation along the optical axis.

If the angling of the TIR prisms (106–108) is progressively steeper, it will help prevent light from the previous light sources along the rod (100) from being reflected out of the rod (100). Thus, the maximum light output at the exit end (110) of the rod (100) is achieved.

Other system configurations based on the principles disclosed herein can achieve the integration of light from an even larger number of light sources along the same length of light integrating rod. For example, FIG. 5 illustrates another system in which light from two different sets of multiple sources is integrated.

Figure 5:
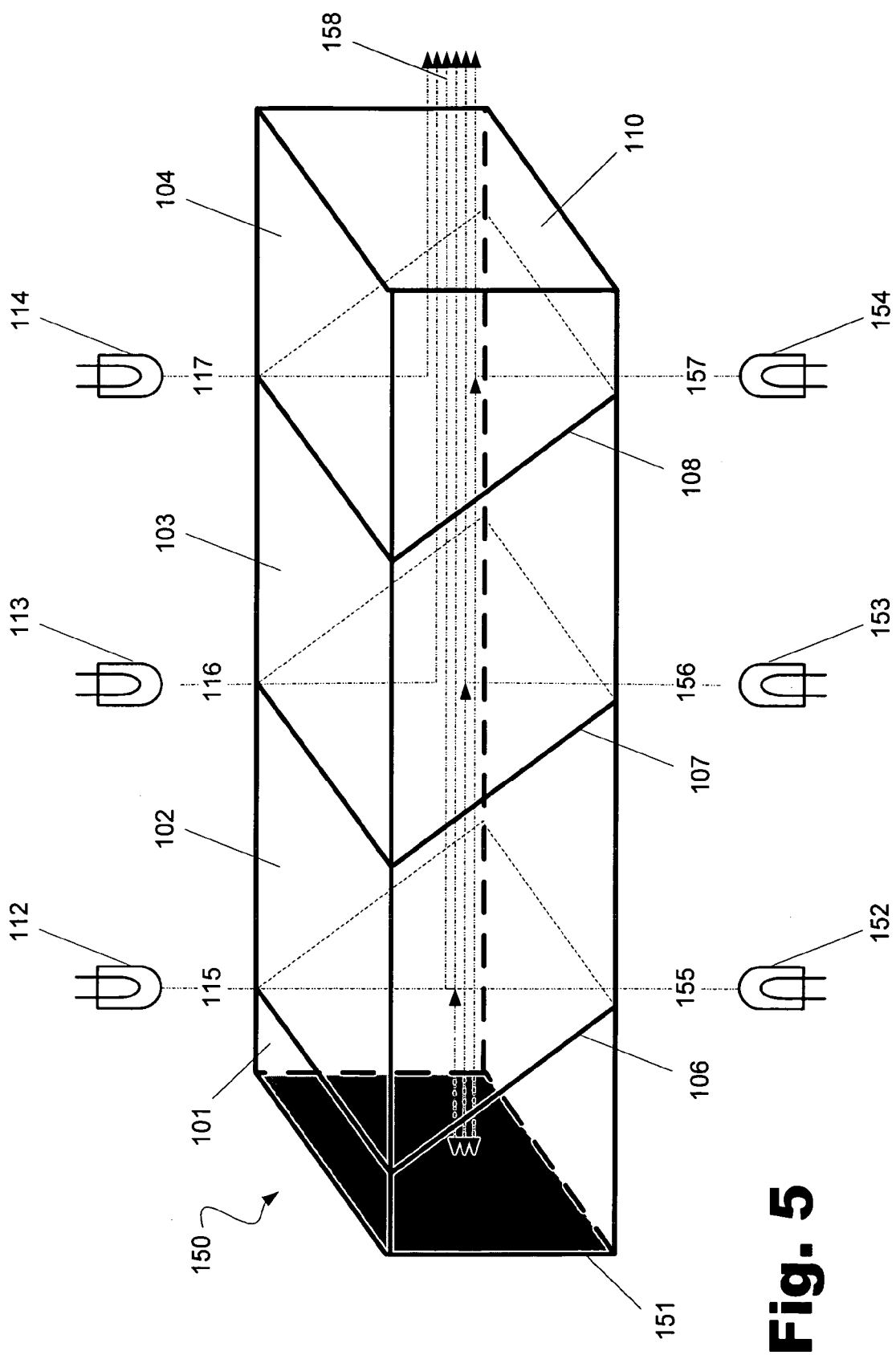
FIG. 5 illustrates another system according to principles described herein in which light from two different sets of multiple sources is integrated.

In some respects, the embodiment of FIG. 5 is similar to that of FIGS. 3 and 4. Four optical elements are integrated to form a light integrating rod (150). Within the rod (150) are three TIR prisms (106–108). As before, the prisms (106–108) are formed at the interfaces of the various optical elements. Also, as above, the number of optical elements in any given embodiment may be larger or smaller than illustrated in FIG. 5 depending on the number of light sources from which light is being integrated and the corresponding number of TIR prisms needed.

In addition, a second set of light sources (152–154) is positioned beneath the light integrated rod (150) in correspondence with the TIR prisms (106–108) of the rod (150). These light sources (152–154) emit light upward into the light integrating rod (150). These beams of light (155–157) are reflected by respective TIIR prisms (106–108). The prisms (106–108) redirect these light beams (155–157) along the optical axis of the light integrating rod (150) toward a rear surface (151) and away from the exit surface (110) of the rod (150). Additionally, the TIIR prisms (106–108) blend the light from the various sources (152–154) to produce an integrated beam.

In addition, a second set of light sources (152–154) is positioned beneath the light integrated rod (150) in correspondence with the TIR prisms (106–108) of the rod (150). These light sources (152–154) emit light upward into the light integrating rod (150). These beams of light (155–157) are reflected by respective TIR prisms (106–108). The prisms (106–108) redirect these light beams (155–157) along the optical axis of the light integrating rod (150) toward a rear surface (151) and away from the exit surface (110) of the rod (150). Additionally, the TIR prisms (106–108) blend the light from the various sources (152–154) to produce an integrated beam.

The rear surface (151) of the light integrating rod (150) is a reflector. For example, the rear surface (151) may be covered with a reflective coating. Consequently, the rear surface (151) reflects the light (155–157) from the lower set of light sources (152–154). The reflected light (155–157) then passes along the optical axis of the rod (150), through the TIR prisms (106–108) to the exit surface (110) of the rod (150).

Consequently, the beam (158) emitted by the rod (150) is an integration of the light from all the light sources (112–114, 152–154) of both the upper and lower sets. As above, the light from any given source may or may not be collimated.

Figure 6:
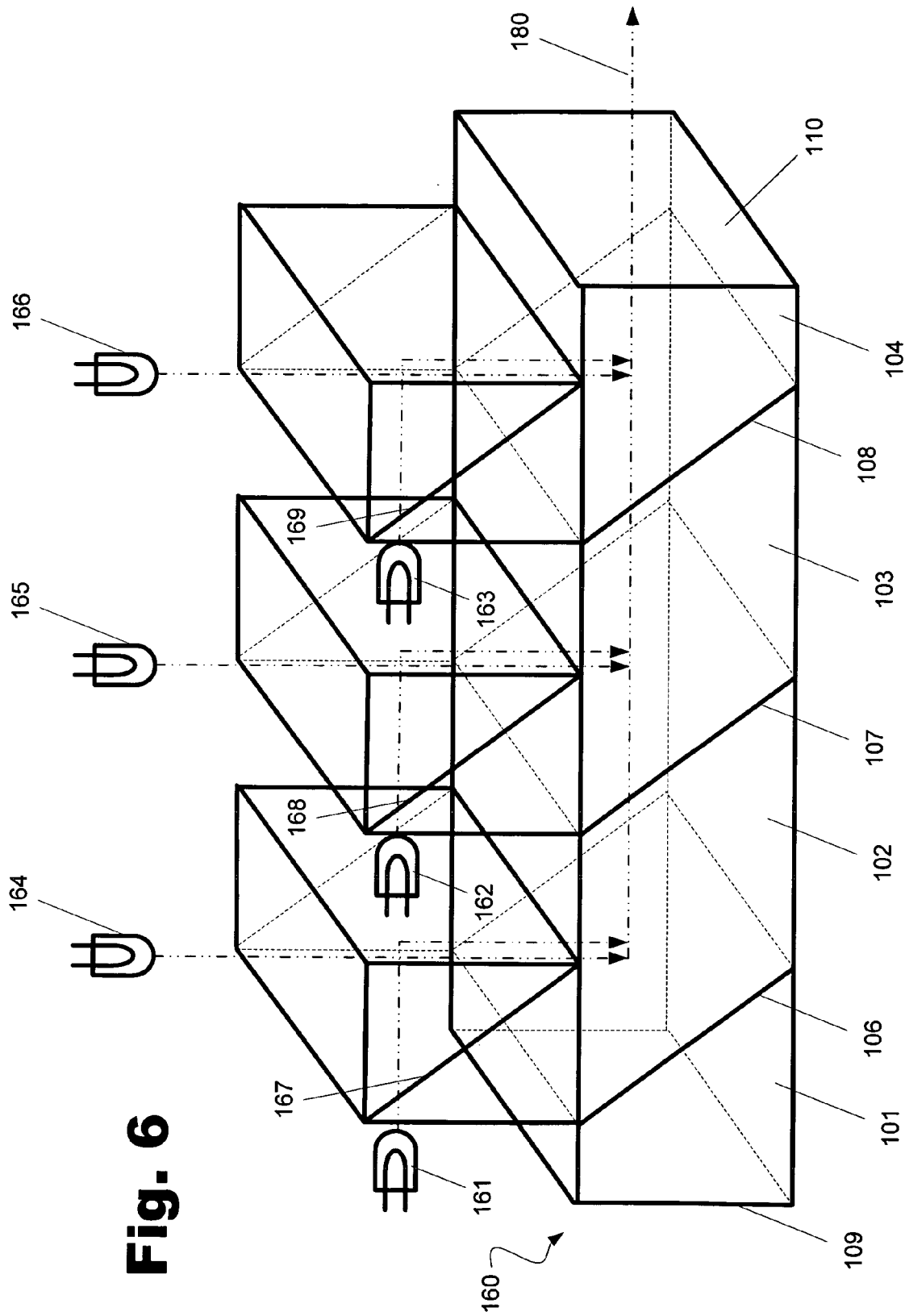
FIG. 6 illustrates another system according to principles described herein in which light from multiple light sources is integrated.

FIG. 6 illustrates another system according to principles described herein in which light from multiple light sources is integrated. The embodiment of FIG. 6 is similar in some respects to the embodiment of FIGS. 3 and 4. As described above, a light integrating rod (160) includes a number of interfaced optical elements (101–104) that form a number of TIR prisms (106–108) at the interfaces between optical elements.

Additionally, as shown in FIG. 6, a corresponding number of additional TIR prisms (167–169) are provided. Each of these additional TIR prisms (167–169) is optically coupled with a respective TIR prism (106–108) in the rod (160).

A first set of light sources (164–166) is disposed above, and in correspondence with, the additional TIR prisms (167–169). Each light of this first set of light sources (164–166) emits a beam of light downward through an additional TIR prism (167–169). The light is then reflected forward by the lower set of TIR prisms (106–108) along the optical axis of the rod (160) toward an exit surface (110) of the rod (160). Additionally, the TIR prisms (106–108) blend the light from the first set of sources (164–166).

A second set of light sources (161–163) are arranged in correspondence with the additional TIR prisms (167–169). Each of the second set of light sources (161–163) emits light into a side face of one of the additional TIR prisms (167–169). This light is redirected by the upper TIR prisms (167–169) downward to a respective TIR prism (106–108) in the rod (160). As before, this light is then reflected forward by the lower set of TIR prisms (106–108) along the optical axis of the rod (160) toward an exit surface (110) of the rod (160). Additionally, the TIR prisms (106–108) blend the light from the second set of sources (161–163) as well as the light from the first set of sources (165–166).

The result is a beam of light (180), which is an integration of the light from all the various sources (161–166) that are optically coupled to the rod (160). As above, the exit surface (110) allows the integrated light beam (180) to be emitted from the rod (160) to, for example, a light integrating tunnel or device, light modulator or other optical device.

As above, the light from any given source may or may not be collimated. In alternative embodiments, any number of optical elements may be used, any number of TIR prisms formed and any number of light sources integrated using a light integrating rod according to the principles described.

Figure 7:
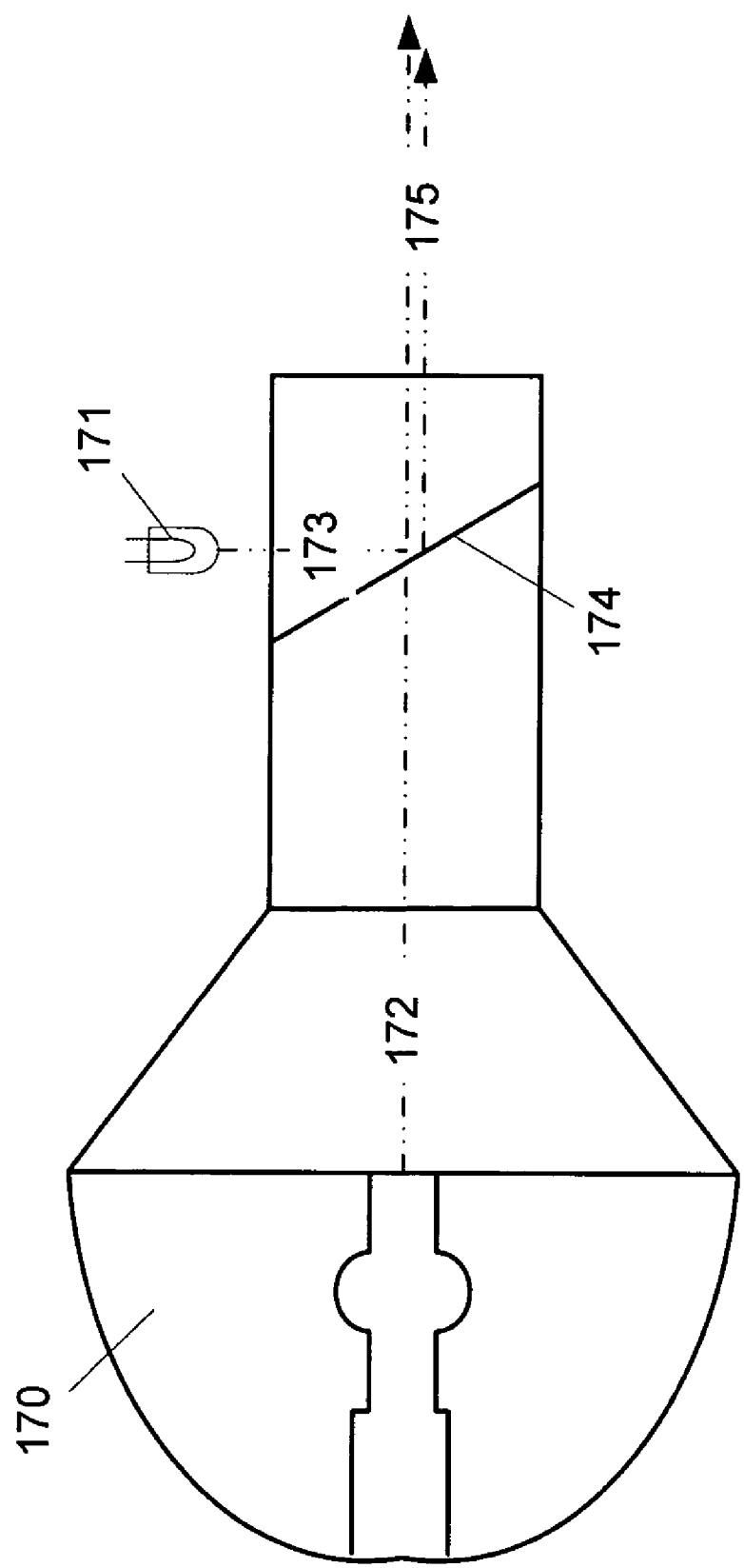
FIG. 7 illustrates a system in which color correction to a light source is effected by integrating the light of a second colored light source.

FIG. 7 illustrates a system in which color correction to a light source is effected by integrating the light of a second colored light source. FIG. 7 illustrates an Ultra High Pressure or Performance (UHP) lamp (170) that might be used in, for example, a projection system. UHP projection lamps are often metal halide lamps, such as mercury vapor. Depending on the chemistry of a particular lamp, the lamp may be color-deficient over a certain portion of the visible spectrum.

For example, some UHP lamps have a relatively low intensity over the red portion of the visible frequency spectrum. Consequently, additional red light can be added to the light output by the projection lamp (170) to compensate for the red color deficiency of the projection lamp (170). As shown in FIG. 7, the light (172) output by the projection lamp (170) passes through a TIR prism (174) that is disposed along the optical axis of the projection lamp (170).

Additionally, a red light source (171) is disposed at the TIR prism (174) and emits a beam of red light (173) into the TIR prism (174). The prism (174) redirects the red light (173) from the red light source (171) along the optical axis of the projection lamp (170). Additionally, the TIR prism (174) blends or integrates the red light (173) with the red-deficient light (172) output by the lamp (170). Consequently, the resulting output light beam (175) may have roughly equal intensity over the frequencies of the visible spectrum.

As will be appreciated by those skilled in the art, the techniques described herein can be applied to any system in which a light is deficient in one or more color components and it would be advantageous to add those color components to the light. The emerging light beam (175) may then be transmitted to projection optics, a light modulator, a light integrating tunnel, or device or any other optical device.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A light integrating system comprising:
   at least one total internal reflection (TIR) prism, said system having an optical axis along which light moves through said system including through said at least one TIR prism, wherein said optical axis may be bent by said at least one TIR prism; and
   a light integrating device disposed to collect and homogenize light exiting from said at least one TIR prism;
   wherein surfaces of said at least one TIR prism that are not on said optical axis of said system have a coating to minimize light loss.

2. The system of claim 1, further comprising two or more light sources for emitting light into said light integrating system.

3. The system of claim 1, wherein surfaces of said at least one TIR prism that are not on an optical axis of said system have an aluminized coating to minimize light loss.

4. The system of claim 1, wherein said light integrating device comprises a light integrating tunnel.

5. The system of claim 4, wherein said light integrating tunnel has a rectangular cross-section.

6. The system of claim 4, wherein said light integrating tunnel has reflective material on inner walls of said tunnel for reflecting and homogenizing light from said TIR prism.

7. The system of claim 1, wherein sad light integrating device comprises a light pipe.

8. The system of claim 1, wherein said light integrating device comprises a solid light conducting rod.

9. The system of claim 1, wherein said light integrating device comprises a condenser lens system.

10. The system of claim 1, further comprising a plurality of optical elements that are optically coupled and have an optical axis, wherein said TIR prism is formed at an interface between two of said optical elements.

11. The system of claim 1, further comprising a plurality of TIR prisms disposed along an optical axis, wherein each subsequent TIR prism has a steeper angle than a previous TIR prism along said optical axis.

12. The system of claim 1, further comprising a plurality of TIR prisms disposed along an optical axis and a plurality of light sources disposed to emit light into said TIR prisms such that said TIR prisms integrate light from said light sources.

13. A light integrating system comprising:
   a plurality of total internal reflection (TIR) prisms;
   wherein said plurality of TIR prisms are disposed in a line along an optical axis with a reflector at one end of said line of TIR prisms for reflecting light back along said optical axis and through each of said TIR prisms.

14. The system of claim 13, further comprising a first set of light sources disposed along one side of said line of TIR prisms and a second set of light sources disposed along an opposite side of said line of TIR prisms.

* * * * *

UNITED STATES PATENT AND TRADEMARK OFFICE
CERTIFICATE OF CORRECTION

| | | |
|---|---|---|
| PATENT NO. | : 7,165,867 B2 | Page 1 of 1 |
| APPLICATION NO. | : 11/490194 | |
| DATED | : January 23, 2007 | |
| INVENTOR(S) | : Long et al. | |

It is certified that error appears in the above-identified patent and that said Letters Patent is hereby corrected as shown below:

Col. 8 (line 18), delete "sad" and insert therefor --said--.

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,165,867 B2 |
| APPLICATION NO. | : 11/490194 |
| DATED | : January 23, 2007 |
| INVENTOR(S) | : Michael Long et al. |

It is certified that error appears in the above-identified patent and that said Letters Patent is hereby corrected as shown below:

On the Title Page, Item (63) priority data, insert

--This application is a continuation of U.S. Patent Application No. 10/772,999, filed February 5, 2004.--

Signed and Sealed this
Twenty-sixth Day of February, 2013

Teresa Stanek Rea
*Acting Director of the United States Patent and Trademark Office*